United States Patent [19]

Harvey

[11] 4,417,638

[45] Nov. 29, 1983

[54] AIR INLET AND AIR DISPERSION GROMMET AND IMPROVED AIR PALLET BEARING SAME

[75] Inventor: Bruce F. Harvey, Newark, Del.

[73] Assignee: American Industrial Research, Newark, Del.

[21] Appl. No.: 311,227

[22] Filed: Oct. 14, 1981

[51] Int. Cl.³ ............................................... B60V 1/04
[52] U.S. Cl. ...................................... 180/125; 285/7; 403/349
[58] Field of Search .............. 180/125, 124, 126, 116; 403/349; 414/676; 285/7, 205, 208, 209, 210

[56] References Cited

U.S. PATENT DOCUMENTS

| | | | |
|---|---|---|---|
| 774,667 | 11/1904 | Houser | 403/349 X |
| 1,932,099 | 10/1933 | Cabana | 403/349 X |
| 2,500,955 | 3/1950 | Martinet et al. | 285/7 |
| 3,423,781 | 1/1969 | Henson | 403/349 X |
| 3,876,199 | 4/1975 | Eichenauer | 403/349 X |
| 3,948,344 | 4/1976 | Johnson et al. | 180/124 |
| 4,155,421 | 5/1979 | Johnson et al. | 180/125 |

*Primary Examiner*—Joseph F. Peters, Jr.
*Assistant Examiner*—Mitchell J. Hill

*Attorney, Agent, or Firm*—Sughrue, Mion, Zinn, Macpeak and Seas

[57] ABSTRACT

A flexible, resilient, annular grommet, preferably flanged at both ends, mounts to a circular hole within a planar generally rigid backing member. The backing member forms with a thin flexible sheet member having at least a portion underlying the backing member, a plenum chamber. The flexible sheet bears perforations to provide an air bearing with an underlying support surface for a load borne by the backing member. The grommet lower flange is bifurcated and separated circumferentially by radial slots to permit lateral escape of the air to the interior of the plenum chamber with the inner flange functioning as air dispersion means within the plenum chamber to insure air flow throughout the chamber when the pallet is under load. A cross-piece or its equivalent, borne by the grommet, functions as a mechanical lock when engaging a rigid air supply tube or nozzle at the end of an air inlet hose, for feeding air under pressure to the plenum chamber. The cross-piece further limits projection of the nozzle within the hole of the grommet, thereby preventing the end of the nozzle from plunging through the thin flexible sheet bearing the perforations.

15 Claims, 5 Drawing Figures

AIR INLET AND AIR DISPERSION GROMMET AND IMPROVED AIR PALLET BEARING SAME

BACKGROUND OF THE INVENTION

This invention relates to planar air pallet material handling systems and more particularly to an air inlet assembly therefor, including an annular grommet and a rigid air supply nozzle, for pressurizing the air pallet plenum chamber.

Planar air pallet material handling systems have recently been evolved utilizing a rigid backing member for supporting the load (which may comprise a case or carton forming the load itself) and acting in conjunction with an underlying thin flexible sheet bearing perforations over the major surface portion of the same. The planar backing member and the thin flexible sheet (or a bag) define a plenum chamber subjected to pressurized air from an air source. Air escaping through the perforation creates a thin air bearing between the perforated portion of the thin flexible sheet and an underlying imperforate support surface such as the ground, floor, etc. Such system and components are set forth in U.S. Pat. No. 3,948,344 entitled "Low Cost Planar Air Pallet Material Handling System" issuing Apr. 6, 1976. Such systems involve perforations which unrestrictedly open directly to the plenum chamber, air dispersion means, provided within the chamber to insure air flow throughout the chamber when the pallet is under load, since the plenum chamber is totally collapsed with load application and no air can flow thereto, and means for controlling pillowing of the flexible sheet portion defining the chamber to allow jacking of the backing surface and the load sufficiently to permit the pallet to accommodate surface irregularities, both for the load support surface and the backing surface, without ballooning. Additionally, some type of air inlet means must be provided to the chamber for permitting the air under pressure to enter the chamber to effect jacking of the load and for ultimate discharge through the perforations to create the frictionless air film.

Since the function of the pallet is to move the load from place to place, a portable supply of air under pressure must be achieved. In the aforementioned patent, a motor driven air compressor may function as a source of pressurized air being borne by a fork lift truck or the like. Alternatively, a battery powered or gasoline engine powered compressor in a back pack arrangement may be borne by workman with a flexible hose coupling the outlet of the air compressor to the air inlet means leading to the plenum chamber of the air pallet itself.

Difficulties have been encountered in making a detachable connection between the pressurized air source and the air pallet. Additionally, even though the connection may be completed, once pressurization has been attempted or achieved, loss of air may occur at the point of connection, and there may be mechanical separation of the air supply hose or its coupling component at the point of connection to the air pallet and acting to break the air seal.

It is, therefore, a primary object of the present invention to provide an improved air inlet and air dispersion grommet, an air inlet assembly including the grommet, and an improved air pallet incorporating such element for air pallet type material handling systems which function to: elevate the underside of the air pallet slightly to facilitate air dispersion for initial inflation of the plenum chamber; effectively seal the connection between a detachable air supply nozzle and the plenum chamber air inlet opening and mechanically interlock the connection elements.

SUMMARY OF THE INVENTION

In one aspect, the invention is directed to an air inlet and air dispersion grommet for a planar air pallet material handling system or the like, wherein the system comprises a planar generally rigid backing member, a thin flexible sheet member including a bottom portion bearing perforations and underlying the backing member with the backing member supporting the load and means including at least the thin flexible sheet member forming a plenum chamber for retaining pressurized air between the bottom portion of the sheet member and the backing member and for creating a thin air film for support of the load for frictionless movement over an underlying supporting surface. The grommet is mounted to one of said members and comprises a hollow annular body sealably fixed to the member, projecting through said one member and opening to the plenum chamber. The body includes a radially outwardly projecting inner flange over a portion of its periphery, within said one member, to space said members apart. Said body also includes radial slot means within a further peripheral portion of said body to the side of said inner flange; whereby, insertion of a tubular air supply nozzle bearing air under pressure into said hollow body causes rapid jacking of said load and dispersion of the air throughout the plenum chamber and creation of said thin film air bearing.

The inner flange may comprise diametrically opposed radial flange portions and the slot means may comprise diametrically opposed radial slots between said radial flange portions. Additionally, an outer flange may be provided to said body extending circumferentially completely about said hole and extending radially outwardly to overlie said one member bearing said grommet with said inner and outer flanges being spaced apart a distance generally equal to the thickness of said one member bearing said grommet. Said grommet may bear detent means for locking to the end of said inserted air supply nozzle. Said detent means may project radially inwardly of said annular body within said opening and engage bayonet slots within the end of said air supply nozzle such that when said nozzle is engaged with said detent means, the end of said nozzle terminates short of the bottom of said inner flange so as to prevent the nozzle from penetrating through the underlying bottom portion of said thin flexible sheet. The detent means may comprise a cross-piece within the grommet opening, oriented in relation to the inner flange or inner flange portions so that the radial slot is not blocked by the lower end of the air supply, such that the bayonet coupling slot therein is aligned with the radial slot of said grommet.

In other aspects, the invention is directed to the combination of an air pallet and such grommet.

DESCRIPTION OF THE PREFERRED EMBODIMENT

Figure 1:
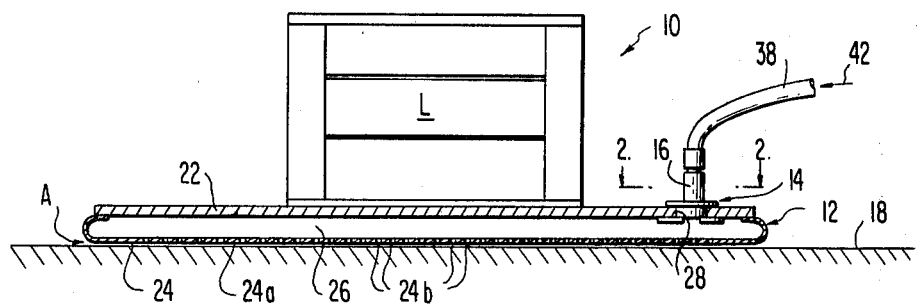
FIG. 1 is a vertical sectional view through an air pallet and grommet forming one embodiment of the present invention.
Figure 2:
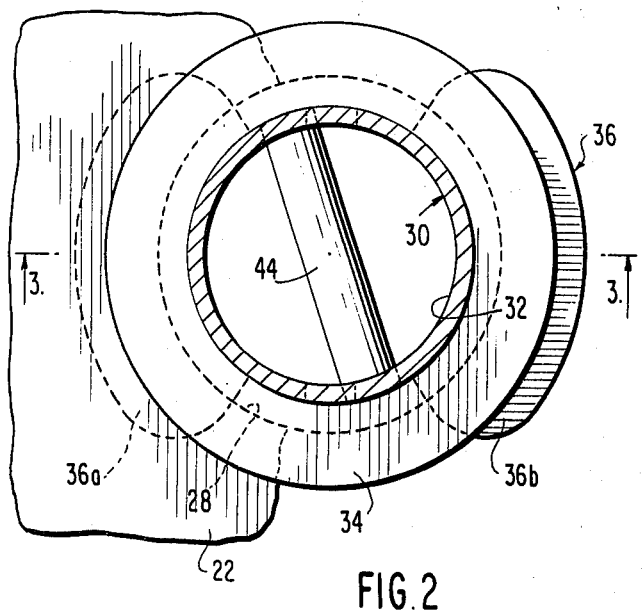
FIG. 2 is a top plan view, partially broken away, of a portion of the embodiment shown in FIG. 1.
Figure 3:
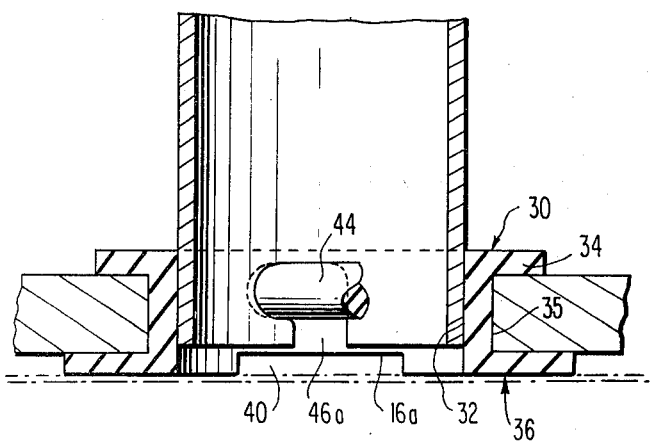
FIG. 3 is a sectional view taken about line 3—3 of FIG. 2.

Referring to FIGS. 1-4 inclusive, there is illustrated one embodiment of the present invention directed to multiple aspects, that is, to an improved flexible sheet air pallet forming the principal components of a material handling system, and as a second aspect, a preferred form of an air inlet and air dispersion grommet forming a component thereof. In that respect, the material handling system, indicated generally at 10, is comprised principally of an improved flexible sheet planar air pallet indicated generally at 12 bearing a load L in the manner of U.S. Pat. No. 3,948,344. Importantly, an air inlet and air dispersion grommet, indicated generally at 14, is integrated with air pallet 12 and receives in sealed, mechanical coupling engagement, an end of an air supply tube or air supply nozzle 16 at the terminal end of a flexible air supply hose 38 from a source of air under pressure indicated schematically by arrow 42. The air source may comprise a back pack carried, battery operated, or internal combustion engine driven air compressor.

In terms of the improved flexible sheet planar air pallet 12, it is adapted to create an air bearing indicated generally at A beneath and between the bottom of the planar air pallet 12 and a load bearing surface formed by a building floor as at 18. The air pallet comprises two principal components in the embodiment shown, an upper, generally rigid backing member at 22, which may constitute a rectangular plywood sheet, and a thin film flexible sheet member 24. Member 24 is sealed at its edges to the edges of the generally rigid planar backing member 22 to define with the backing member, an air plenum chamber 26. The bottom portion 24a of the thin flexible sheet member 24 bears a plurality of small diameter perforations 24b which preferably open unobstructedly to the interior of the plenum chamber 26. The perforations 24b cover the area of member 22 occupied by the load L. In this respect, the planar air pallet 12 is identical to that set forth in U.S. Pat. No. 3,948,344.

The present invention is particularly directed to the make up and construction of various forms of the air inlet and air dispersion grommet 14 which in the embodiment of FIGS. 1-4 is mounted to, and project through, the upper generally rigid planar backing member 22. In this case plywood sheet 22 bears a circular opening or hole 28 at one end of the sheet and to the side of the load L. Grommet 14 comprises a hollow, annular body 30 of short axial length, having a central opening or hole 32 extending the length of the same. The body 30 which may be rigid, is preferably formed of an elastomeric material and thus is both flexible and resilient. Further, preferably, it is provided with an outer flange 34 which extends about the complete circumference of the full 360° and projects radially outwardly a certain distance from the outer periphery 35 of a main body portion 30a of the grommet 14. In addition to an outer flange 34, an inner flange included generally at 36 is provided thereto which also extends radially outwardly of the outer periphery 36. In this embodiment, inner flange 36 is divided into two portions 36a and 36b which are identical, diametrically opposite each other and which extend only over a portion of the circumference of the body, being separated from each other by radial slots 40, also diametrically across from each other. The outer flange 34 and the inner flange 36 are, in the illustrated embodiment, of generally the same thickness, although this is not necessary. As may be appreciated, the flanges 34 and 36 may be flat. Further, the outer diameter of main body portion 30a of body 30 is equal to or slightly larger than the diameter of opening or hole 28 within the relatively rigid backing member 24 of air pallet 12. Even though the flange portions 36a and 36b are wider than the diameter of hole 28, because of the elastomeric, flexible nature of the grommet, they can be snapped into the hole 28. Further, by properly dimensioning the main body portion 30a and by properly separating the outer and inner flanges 34 and 36 so as to nearly match the thickness of the generally rigid backing member 22, the grommet self seals to the backing member when employed in the manner of the illustrated embodiment in FIGS. 1-4 inclusive. By matching the gap or distance between flanges to the thickness of the board 22 or making the gaps slightly smaller, an excellent air seal is formed between the grommet 14 and the board 22 preventing escape of air about the periphery of the grommet when the plenum chamber 26 is pressurized.

Figure 4:
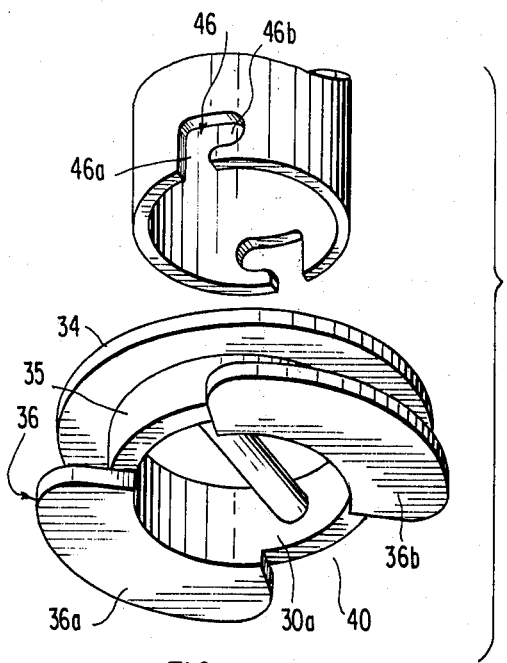
FIG. 4 is a perspective view of the grommet and air supply tube illustrated in FIG. 3.

As may be appreciated, the grommet 14 may be applied to the thin flexible sheet, whether it be in the sheet form shown and edge sealed to the periphery of the board 22 or, if it comprises a bag having upper and lower walls, and completely envelopes a generally rigid backing member as in FIG. 4 of U.S. Pat. No. 3,948,344. In that case, the grommet would be adhesively bonded to the thin flexible sheet at the point where it penetrates the sheet and opens to the plenum chamber. Further, in the illustrated embodiment of the invention, the outer flange 34 may be eliminated, in which case adhesive material may be employed for sealably and fixedly mounting the main body portion 30a of the grommet to board 22 or the like and within hole 28. In that case, as well as in other cases, the grommet 14 instead of being flexible and resilient by being formed of elastomeric material or the like, may be rigid and sized exactly to hole 28.

While the outer flange 34 may be eliminated, there is a necessity for a inner flange 36, since this flange functions in conjunction with at least one radial air slot as at 40 to direct air between the bottom sheet portion 24a of the thin flexible sheet 24 and the relatively rigid backing member and thus permit air dispersion and controlled jacking of the load L, which are requirements necessary to permit the planar air pallet to perform its frictionless material transport function.

As an another aspect of the present invention, the grommet, particularly where it is formed of a resilient flexible material, allows a sealed connection as well as mechanical attachment between the grommet and the air supply tube or nozzle 16. As shown in FIG. 1, the air supply nozzle 16 is sealably coupled to an end of flexible air supply hose 38 and receives air under pressure from a supply or source as indicated by arrow 42. The nozzle 16, which may be formed of metal, plastic or the like, has an outer diameter on the order of, or slightly larger than the diameter of hole 32 within the grommet. Thus, with the grommet formed of a resilient material, the forced projection of the lower end of the nozzle 16 into the hole 32 effects a frictionally sealed connection between the air supply nozzle 16 and the air pallet via the grommet 14 and permits air under pressure from source 42 to flow directly to the interior of the plenum chamber 26, interiorly of the planar pallet 12.

Regardless of whether the grommet 14 is formed of an elastomeric material or whether it is rigid, the grommet is preferably provided with detent means for forming a mechanical interlock between the grommet and the air supply nozzle 16. In the illustrated embodiment of FIGS. 1-4, the grommet bears integrally a rodlike cross-piece 44 which spans the opening 32, is circular in cross-section and is of relatively small diameter. Further, it is purposely angularly misaligned with respect to the diametrically opposed slots 40. This is because the end of the air supply nozzle 16 bears diametrically opposed inverted L-shaped bayonet slots, indicated generally at 46, including an axial portion 46a extending upwardly from edge 16a of the nozzle intersecting a transverse portion 46b of the bayonet slot. Further, the length of the axial portion 46a is preset relative to the width of the transverse section 46b such that when the air supply nozzle 16 is inserted into hole 32 of the grommet with the axial section 46a aligned with and receiving cross-piece 44, the cross-piece bottoms out against the transverse slot portion 46b to prevent further penetration of the air supply nozzle. Edge 16a of the air supply nozzle cannot penetrate axially through the grommet but is spaced just above the bottom of the grommet. This prevents the edge 16a from piercing that portion 24a of the thin flexible sheet 24 which directly underlies grommet 14, the thin plastic film or the like being readily susceptible to tearing and mechanical abrasion. Further, once the cross-piece 44 enters the radial slot portion 46b of the bayonet slot 46, the air supply nozzle is rotated so that the cross-piece seeks the end of slot portion 46b remote from the axial slot portion 46a, thus forming a mechanical interlock whereby a simple lifting of the air supply nozzle 16 also lifts the air pallet 12 or at least tends to lift the generally planar backing member 22 away from the underlying thin film flexible sheet 24.

When load L is placed on top of the air pallet 12, the load L flattens the board 22 against the thin film sheet 24 and against the rigid support surface 18. Air is still permitted to enter into a portion of the plenum chamber which is not closed off, that is, a small area defined by the radial slots 40 of the grommet as well as the gap between flange sections 36a, 36b, board 22 and film 24 respectively. Sufficient air space is provided so that ready initial jacking of the load may occur, whereupon upon full dispersion of air under pressure occurs within plenum chamber 26. Air tends to escape through the outer rows of perforations 24b, thereby accomplishing jacking of load L and defining a very thin, several mil, air film A to permit frictionless movement of the load by light force movement of the air pallet over the surface 18.

As may be appreciated, similar to that occurring using the air pallets of U.S. Pat. No. 3,948,344, jacking of the load terminates when a sufficient number of perforations are exposed to balance out the flow of air entering the plenum chamber to that escaping from the perforations. As may be further appreciated, the oblique location of the cross-piece relative to the inner flange portions 36a, 36b and radial lots 40, insures that with the bayonet coupling achieved, the bayonet slot 46 in the air supply nozzle 16 is aligned with and faces the slots 40 within the grommet defining radial air passages and is not blocked by a lower flange 36.

While it may be appreciated that the air supply nozzle 16 could be simply friction force fitted to hole 32 within the grommet A, regardless of whether the grommet were rigid or flexible and resilient, and where such friction coupling may be additionally facilitated by tapering slightly the exterior surface of the lower end of the air supply nozzle, the mechanical interlock facilitates the ends of the material handling systems employing the illustrated apparatus.

Figure 5:
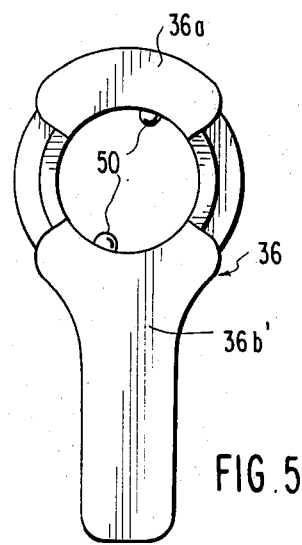
FIG. 5 is a bottom plan view of another form of grommet forming an alternate embodiment of the invention.

However, it is not necessary to use a cross-piece as a single rod. Intersecing rod portions as in cruciform configuration or a cross-piece of Y-shape and using four bayonet slots or three bayonet slots, respectively, within the air supply nozzle, may be used. Also, paired, opposed projections which project radially inwardly only to a limited extent may be employed, as long as they are capable of projecting within the bayonet slots 46 borne by the air supply nozzle 16. Such arrangement is illustrated in FIG. 5, wherein the crosspiece 44 is replaced by paired opposed rounded radially inward projections 50 which are diametrically opposed so as to handle the same air supply nozzle 16 as in the embodiment of FIGS. 1-4 inclusive.

Further, the inner flange 36 in this case comprises diametrically opposite flange portions 36a and 36b'. Portion 36a is identical to that of the FIGS. 1-4 embodiment, while the flange portion 36b' is elongated and projects radially well beyond flange portion 36b of the prior embodiment, thereby greatly increasing the initial area or space between the relatively rigid planar backing member and the underlying thin flexible sheet portion defining the plenum chamber. Thus, jacking of the load and the creation of the air bearing is favorably influenced by the added inner flange area during the initial pressurization of the plenum chamber 26.

It should be further appreciated that the provision of the flanges prevents, during air pressurization, the blowing out of the grommet as well as blowing in of the grommet and facilitates the air seal between the grommet and the member bearing the same. The mechanical interlock functions to prevent the air supply nozzle and thus elements of the air supply system from blowing out or away from air pallet or vice versa, during the filling of the air pallet plenum chamber with air under pressure. It should be also appreciated that where the grommet is made of rigid material molded or otherwise formed, it could be formed in two parts with parts applied from opposite sides of the air pallet member hole 28 and joined together by adhesive. Further, if one were employing an air bag as the principal component of the planar air pallet, the grommet would be very thin and the gap between flanges would be keyed to the thickness of the thin flexible film material forming the air bag.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An air inlet and air dispersion grommet for a planar air pallet materials handling system or the like, said system comprising:
  a planar, generally rigid backing member,
  a thin flexible sheet member including a bottom portion bearing perforations underlying said backing member, said backing member supporting a load, means including at least said thin flexible sheet member forming a plenum chamber for retaining pressurized air between the bottom portion of said sheet and said backing member and for creating a thin air film between the bottom portion of said sheet and an underlying support surface for allowing frictionless movement of said load over said underlying supporting surface, said grommet being mounted to one of said members and comprising a hollow annular body sealably fixed to said one member and opening to said plenum chamber, said body including at least one radially outwardly projecting inner flange over a portion of its periphery, within said plenum chamber and functioning to space said members apart, said body also including slot means within a peripheral portion of said body opening to said plenum chamber and to the interior of said hollow body, to the side of said inner flange, and means for insuring air flow from a tubular air supply nozzle bearing air under pressure when inserted into said annular body through said slot means, whereby, insertion of the end of said tubular air supply nozzle bearing air under pressure into said hollow annular body permits rapid jacking of said load, dispersion of the air throughout said plenum chamber, and creation of said thin film air bearing.

2. The grommet as claimed in claim 1, wherein said inner flange comprises diametrically opposed radial flange portions and wherein said slot means comprise diametrically opposed radial slots between said radial flange portions.

3. The grommet as claimed in claim 1, further comprising an outer flange extending radially outwardly and circumferentially completely about the periphery of said body so as to overlie said one member bearing said grommet, and wherein said inner and outer flanges are spaced apart a distance approximately equal to the thickness of said one member bearing said grommet to sealably engage said grommet to said one member.

4. The grommet as claimed in claim 1, further comprising detent means for mechanically locking the end of the inserted air supply nozzle to said grommet.

5. The grommet as claimed in claim 4, wherein the end of said air supply nozzle comprises diametrically opposed bayonet slots, and said detent means comprises projection means projecting radially inwardly of said hollow annular body at positions corresponding to the circumferential spacing of said bayonet slots for engagement with said bayonet slots, and wherein said projection means are axially located within said hollow annular body such that when said nozzle bayonet slots engage with said projection means, the end of said nozzle terminates short of the bottom of said hollow grommet so as to prevent said nozzle from piercing the underlying bottom portion of said thin flexible sheet and defining said means for insuring air flow from the nozzle through said slot means.

6. The grommet as claimed in claim 1, wherein said projection means comprises a cross-piece extending across the interior of said hollow body and oriented angularly with respect to the inner flange such that said slot means of said grommet is aligned with a bayonet slot within the end of said air supply nozzle.

7. The grommet as claimed in claim 1 wherein said body is flexible and resilient.

8. The grommet as claimed in claim 1 wherein said body is formed of elastomeric material.

9. In combination, a planar air pallet comprising:

a planar, generally rigid backing member, a thin flexible sheet member including a bottom portion bearing perforations underlying said backing member, said backing member supporting a load thereon, means including at least said thin flexible sheet member forming a plenum chamber for retaining pressurized air between the bottom portion of said sheet member and said backing member for creating a thin film air bearing for support of said load for frictionless movement over an underlying supporting surface, the improvement comprising:

a grommet mounted to one of said members and comprising a hollow annular body sealably fixed to said one member and opening to said plenum chamber, said body including a radially outwardly projecting inner flange over a portion of its periphery within said one member to space said members apart, and wherein said body further includes slot means within a portion of said body opening to the interior of said hollow body and to the side of the inner flange, and means for insuring air flow from a tubular air supply nozzle bearing air under pressure when inserted into said hollow annular body through said slot means, whereby, insertion of said tubular air supply nozzle bearing air under pressure into said hollow body causes rapid jacking of said load and dispersion of air throughout said plenum chamber and creation of said thin film air bearing.

10. The air pallet as claimed in claim 9, wherein said inner flange comprises diametrically opposed radial flange portions and said slot means comprises diametrically opposed radial slots between said radial flange portions.

11. The air pallet as claimed in claim 9, further comprising an outer flange provided to said annular body and extending circumferentially completely about said hole and extending radially outward thereof to overlie said one member bearing said grommet and wherein said inner and outer flanges are spaced apart a distance generally equal to the thickness of said one member bearing said grommet to effect sealing therebetween.

12. The air pallet as claimed in claim 9, wherein said grommet comprises an elastomeric material, and wherein the distance between said inner and outer flanges is slightly less than the thickness of said one member such that said flanges compressibly grip said one member about said hole to form a resilient air seal therebetween.

13. The air pallet as claimed in claim 9, wherein said grommet further comprises detent means for mechanically interlocking the end of said inserted air supply nozzle to said grommet, and wherein said detent means further comprises means for preventing the end of said inserted air supply nozzle from penetrating completely through said hollow grommet and piercing the underlying bottom portion of said thin flexible sheet and form said means for insuring air flow from said nozzle through said slot means.

14. The air pallet as claimed in claim 9, wherein said detent means comprise radial projection means within said hollow grommet, and wherein the end of said inserted air supply nozzle bears bayonet slot means for receiving said radial projecting means.

15. The air pallet as claimed in claim 9, wherein said detent means comprise a cross-piece integrally formed with said grommet and extending across the hollow interior of said grommet, and wherein said cross-piece is axially located such that its engagement with said bayonet slot means of said air supply nozzle limits penetration of said air supply nozzle within said hollow grommet.

* * * * *